(12) United States Patent
Cherubini

(10) Patent No.: US 7,058,125 B2
(45) Date of Patent: Jun. 6, 2006

(54) DATA COMMUNICATIONS

(75) Inventor: Giovanni Cherubini, Rueschlikon (CH)

(73) Assignee: International Business Machines Corporation, Armonk, NY (US)

(*) Notice: Subject to any disclaimer, the term of this patent is extended or adjusted under 35 U.S.C. 154(b) by 690 days.

(21) Appl. No.: 09/921,508

(22) Filed: Aug. 2, 2001

(65) Prior Publication Data

US 2003/0152141 A1 Aug. 14, 2003

(51) Int. Cl.
*H04B 17/00* (2006.01)

(52) U.S. Cl. .................................................. 375/225

(58) Field of Classification Search ........ 375/219–222, 375/224–225, 227, 259, 285, 295–297, 316–317, 375/345–347, 377, 358, 354; 370/229, 232, 370/241, 249, 431, 230; 455/63.1, 67.11, 455/67.13, 69, 522, 39, 68, 517, 507, 500
See application file for complete search history.

(56) References Cited

U.S. PATENT DOCUMENTS

| | | | | |
|---|---|---|---|---|
| 5,924,015 A | * | 7/1999 | Garrison et al. | 455/13.4 |
| 6,001,131 A | * | 12/1999 | Raman | 704/226 |
| 6,252,898 B1 | * | 6/2001 | Eto et al. | 375/130 |
| 6,427,135 B1 | * | 7/2002 | Miseki et al. | 704/258 |

* cited by examiner

*Primary Examiner*—Mohammed Ghayour
*Assistant Examiner*—Pankaj Kumar
(74) *Attorney, Agent, or Firm*—Douglas W. Cameron; Anne Vachon Dougherty

(57) ABSTRACT

Described is a method for communicating information signals via respective channels, each having at least one subchannel, of a multichannel communications link between a transmitting node and a receiving node of a data communications network The method comprises the steps of: at the receiving node, determining for each subchannel of each channel, in dependence on the signal to noise ratio of the channel and a target transmission rate for the information signal over that channel, a gain factor to be applied at the subchannel signal at the transmitting node to effect transmission of the information signal to the receiving node with minimum transmission power; communicating the gain factors for each subchannel signal from the receiving node to the transmitting node; applying the gain factors to the corresponding subchannel signals at the transmitting node; and, at the receiving node, for each subchannel of each channel, partitioning the subchannels of the other channels into high crosstalk subchannels and low crosstalk subchannels, and decoding the subchannel signal in dependence on the or each high crosstalk subchannel signal. Communications systems and receivers for performing such a method are also described, together with computer program products for such receivers.

13 Claims, 15 Drawing Sheets

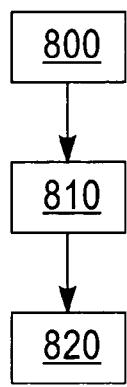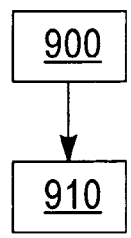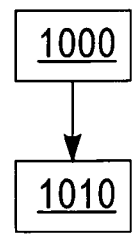
FIG. 17
FIG. 18
FIG. 19

DATA COMMUNICATIONS

BACKGROUND OF THE INVENTION

1. Technical Field

The present invention generally relates to data communications and particularly relates to upstream power back off and multiple user detection in communications schemes such as Very High Speed Digital Subscriber Loop (VDSL) communications.

2. Description of Related Art

VDSL communications technology is emerging as the DSL technology for two-way broad band network access. It is expected to be primarily deployed within a "fiber-to-the-cabinet" architecture. VDSL standards are in an advanced specification phase at regional standards bodies. Work is also underway at International Telecommunication Union—Telecommunication Standardization Sector (ITU-T) to define an international VDSL recommendation. Data rates specified to date include: up to 26 Mbit/s downstream from a central office or optical network unit to a remote terminal; 4.8 Mbit/s upstream for asymmetric transmission; and, up to 14 Mbit/s for symmetric transmission. For VDSL systems, a frequency-division duplexing (FDD) technique has been adopted, whereby separate frequency bands are allocated to upstream and downstream transmissions. Near-end cross talk (NEXT) is avoided by this duplexing technique. The predominant source of interference is therefore far-end crosstalk (FEXT).

Decision Feedback Equalizer (DFE) structures with cross-coupled filters have previously been considered for interference suppression in wireless CDMA communications [1] and fast Ethernet transmission [2].

Upstream power back-off methods are conventionally employed to allow remote users in a VDSL system to achieve a fair distribution of the available capacity in the presence of FEXT [3]. The upstream VDSL transmission rates which are achievable with the power back-off methods that have been contemplated to date usually depend on parameters such as a reference length, or the integral of the logarithm of the received signal power spectral density (PSD). The values assigned to these parameters are obtained by various tradeoffs between services to be offered, and allowed maximum line length. Consequently, the application of currently conventional power back-off methods result in a limited allocation of signal power for upstream transmission.

SUMMARY OF THE INVENTION

In accordance with the present invention, there is now provided a method for communicating an information signal via one or more subchannels of a communications channel between a transmitting node and a receiving node of a data communications network, the method comprising the steps of: at the receiving node, determining for the or each subchannel, in dependence on the signal to noise ratio of the channel and a target transmission rate for the information signal, a gain factor to be applied to the subchannel signal at the transmitting node to effect transmission of the information signal to the receiving node with minimum transmission power; communicating the gain factor for the or each subchannel signal from the receiving node to the transmitting node; applying the gain factor to the corresponding subchannel signal at the transmitting node; and, transmitting the information signal to the receiving node.

The determining step preferably comprises the step of simulated annealing, applying the generic probabilistic meta-algorithm for global optimization problems iteratively to locate a good approximation to the global optimum of the given function in a large search space.

Viewing the present invention from another aspect, there is now provided a method for optimizing transmission power for communication of an information signal via one or more subchannels of a communications channel between a transmitting node and a receiving node of a data communications network, the method comprising the receiving node performing the steps of: determining for the or each subchannel, in dependence on the signal to noise ratio of the channel and a target transmission rate for the information signal, a gain factor to be applied to the subchannel signal at the transmitting node to effect transmission of the information signal to the receiving node with minimum transmission power; and, communicating the gain factor for the or each subchannel signal from the receiving node to the transmitting node.

Viewing the present invention from yet another aspect, there is now provided a data communications network comprising: a transmitting node; a receiving node; a communication link for communicating an information signal between the transmitting node and the receiving node the communication channel having one or more subchannels; the receiving node having a receive signal processor for determining for the or each subchannel, in dependence on the signal to noise ratio of the channel and a target transmission rate for the information signal, a gain factor to be applied to the subchannel signal at the transmitting node to effect transmission of the information signal to the receiving node with minimum transmission power, and for communicating the gain factor for the or each subchannel signal to the transmitting node; and, the transmitting node having a transmit signal processor for applying the gain factor to the corresponding subchannel signal at the transmitting node, and transmitting the information signal to the receiving node. The communications channel preferably comprises a plurality of subchannels.

Viewing the present invention from a further aspect, there is now provided, a receiving node for a data communications network comprising a communication channel for communicating an information signal between a transmitting node and the receiving node, the communication channel having one or subchannels, the receiving node having a receive signal processor for determining for the or each subchannel, in dependence on the signal to noise ratio of the channel and a target transmission rate for the information signal, a gain factor to be applied to the subchannel signal at the transmitting node to effect transmission of the information signal to the receiving node with minimum transmission power, and for communicating the gain factor for the or each subchannel signal to the transmitting node.

Viewing the present invention from still another aspect, there is now provided a method for compensating for cross talk in a multichannel communications link comprising a plurality of channels each having at least one sub channel, between a transmitting node and a receiving node of a data communications network, the method comprising, in a receiving node, for the or each subchannel of each channel, the steps of: partitioning the subchannels of the other channels into high crosstalk subchannels and low crosstalk subchannels; and, decoding the subchannel signal in dependence on the or each high crosstalk subchannel signal. The subchannels may be partitioned into high crosstalk subchannels and low crosstalk subchannels in dependence on a threshold crosstalk level. However, other partitioning schemes will be equally apparent to those skilled in the art.

Viewing the present invention from another aspect, there is now provided a receiver for compensating for cross talk in a multichannel communications link comprising a plurality of channels each having at least one sub channel, the receiver comprising a signal processor to, for the or each subchannel of each channel, partition the subchannels of the other channels into high crosstalk subchannels and low crosstalk subchannels, and decode the subchannel signal in dependence on the or each high crosstalk subchannel signal.

Viewing the present invention from yet another aspect, there is now provided a method for communicating information signals via respective channels, each having at least one subchannel, of a multichannel communications link between a transmitting node and a receiving node of a data communications network, the method comprising the steps of: at the receiving node, determining for each subchannel of each channel, in dependence on the signal to noise ratio of the channel and a target transmission rate for the information signal over that channel, a gain factor to be applied at the subchannel signal at the transmitting node to effect transmission of the information signal to the receiving node with minimum transmission power; communicating the gain factors for each subchannel signal from the receiving node to the transmitting node; applying the gain factors to the corresponding subchannel signals at the transmitting node; and, at the receiving node, for each subchannel of each channel, partitioning the subchannels of the other channels into high crosstalk subchannels and low crosstalk subchannels, and decoding the subchannel signal in dependence on the or each high crosstalk subchannel signal.

The present invention also extends to a computer program product for optimizing transmission power for communication of an information signal via one or more subchannels of a communications channel between a transmitting node and a receiving node of a data communications network, the computer program product comprising a machine readable storage medium storing computer program code which, when loaded in a programmable signal processor in the receiving node, configures the processor to perform the steps of: determining for the or each subchannel, in dependence on the signal to noise ratio of the channel and a target transmission rate for the information signal, a gain factor to be applied to the subchannel signal at the transmitting node to effect transmission of the information signal to the receiving node with minimum transmission power; and, communicating the gain factor for the or each subchannel signal from the receiving node to the transmitting node.

The present invention further extends to a computer program product for compensating for cross talk in a multichannel communications link comprising a plurality of channels each having at least one sub channel, between a transmitting node and a receiving node of a data communications network, the computer program product comprising a machine readable storage medium storing computer program code which, when loaded in a programmable signal processor in the receiving node, configures the processor to perform, for the or each subchannel of each channel, the steps of: partitioning the subchannels of the other channels into high crosstalk subchannels and low crosstalk subchannels; and, decoding the subchannel signal in dependence on the or each high crosstalk subchannel signal.

The term transmitting node as used herein encompasses, as the context dictates: a single transmitting user communicating with a receiving node over a communications link; a plurality of distributed transmitting users communicating with a plurality of distributed receivers over a multichannel communications link; a plurality of distributed transmitting users communicating with a plurality of receivers in the same location over a multichannel communications link; a plurality of transmitters in the same location communicating with a plurality of distributed receivers over a multichannel communications link; and, a plurality of a plurality of transmitters in the same location communicating with a plurality of receivers in the same location over a multichannel communications link.

In a preferred embodiment of the present invention to be described shortly for application to DSL systems, there is provided a power back-off signal processing technique for joint application with multi-user detection. In accordance with technique: the Power Spectral Densities (PSDs) of the transmit signals of the users in the network are determined such that each individual user achieves the desired rate; for each individual user, the transmit signal PSD is computed by taking into account the distribution of known target rates and estimated line lengths and crosstalk coupling functions of users in the network; and, the total power for upstream signals is minimized from a plurality of transmitting users to a receiving central node to reduce interference with other services in the same cable binder.

Embodiments of the present invention stem from a realization that multi-user detection techniques are useful for achieving good performance in communications systems where signals conveying the desired information are received in the presence of noise and multiple-access interference. These techniques can be applied to VDSL transmission if the FEXT signals at the input of a VDSL receiver in the upstream or downstream direction are viewed as interfering signals sharing the same channel as the desired signal. Several approaches within the framework of multi-user detection can be envisaged for mitigating FEXT. In a preferred embodiment of the present invention, a DFE structure with cross-coupled linear forward equalizers and feedback filters is provided for crosstalk suppression. The optimum DFE coefficients for the DFE structure are preferably determined in a minimum mean-square error (MMSE) sense assuming that each user adopts multicarrier modulation for upstream transmission. In a preferred embodiment of the present invention, a system with reduced complexity is provided in which, for each user and each sub channel, only the most significant interferers are suppressed. The advantageous performance of such system with joint application of upstream power back-off is described herein.

BRIEF DESCRIPTION OF THE DRAWINGS

Preferred embodiment of the present invention will now be described, by way of example only, with reference to the accompanying drawings, in which:

FIG. 17 is a flow chart corresponding to an example of a method embodying the present invention for communicating an information signal via one or more subchannels of a communications channel between a transmitting node and a receiving node;

FIG. 18 is a flowchart corresponding to an example of a method for optimizing transmission power for communication of an information signal via one or more subchannels of a communications channel between a transmitting node and a receiving node of a data communications network in accordance with the present invention; and, FIG. 19 is a flowchart corresponding to an example of a method embodying the present invention for compensating for crosstalk in a multichannel communications link comprising a plurality of channels each having at least one sub channel, between a transmitting node and a receiving node of a data communications network.

DETAILED DESCRIPTION OF ILLUSTRATIVE EMBODIMENT

A problem addressed in the following is that of multi-user detection for upstream very-high-speed digital subscriber line (VDSL) transmission, where far-end crosstalk (FEXT) signals at the input of a VDSL receiver are viewed as interferers that share the same channel as the remote user signal. The joint application of upstream power back-off with a reduced-complexity decision-feedback (DFE) multi-user detector, where only the most significant crosstalk interferers are suppressed, is considered, and the coefficients of the minimum mean-square error structure are determined. Then an example of an optimum power back-off algorithm embodying the present invention is introduced, and its performance in terms of achievable rates compared with two conventional methods. Finally, numerical results that illustrate the impact of power back-off on achievable performance of a VDSL system with multi-user detection are presented.

Initially, an example of a joint power back-off and multi-user detection technique for VDSL in accordance with the present invention will be described. Examples of VDSL communications apparatus embodying the present invention will also be described. Expressions of the coefficients of a MMSE-DFE subsystem for multi-user detection will be presented. An optimized power back-off algorithm will also be introduced. In addition, achievable rates of VDSL upstream transmission in the two bands 2.9–5.1 MHz and 7.05–12.0 MHz using the algorithm without multi-user detection will be evaluated and compared with the rates achievable by two conventional power back-off methods. Numerical results will be presented to illustrate the rates achievable by the application of multi-user detection, for cases with and without joint application of optimum power back-off. The relative merits of multi-user detection and coding are also discussed.

Figure 1:
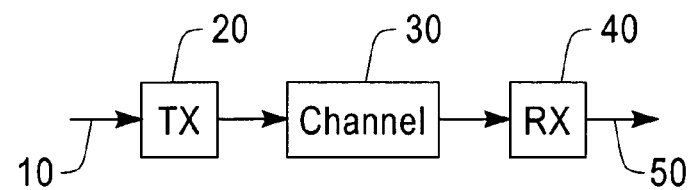
FIG. 1 is a simplified block diagram of communications system.

Referring first to FIG. 1, an example of a VDSL communication system embodying the present invention comprises a transmitter 10 connected to a receiver 40 via a communications channel 30. In operation, the transmitter 20 receives an information bit stream 10 from an information source 10. The information bit stream 10 is translated by the transmitter 20 into signals for communication to the receiver 40 via the communication channel 30. The receiver 40 generates an output information bit stream 50 based on the signals received from the channel 30.

Figure 2:
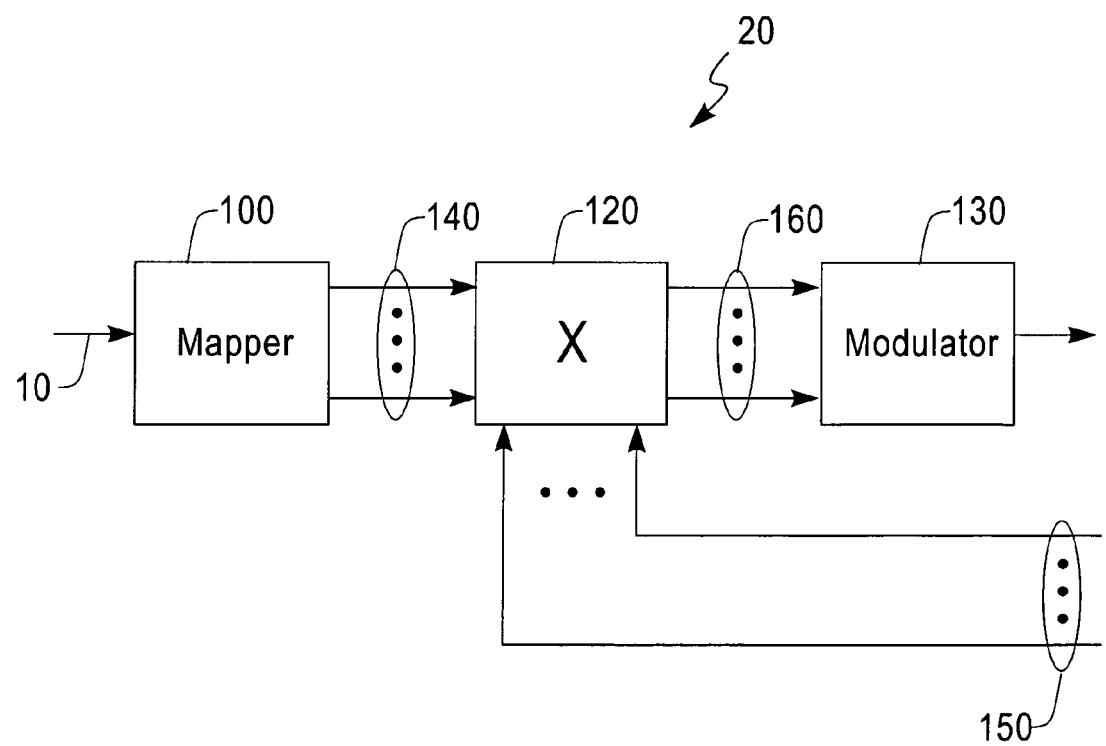
FIG. 2 is a block diagram of a transmitter of the communications system.

With reference to FIG. 2, the transmitter 20 comprises a mapper 100 connected to a multicarrier modulator 130 via a multiplier stage 120. In operation, the mapper 100 converts the input information bit stream into a plurality of parallel streams of symbols 140 each corresponding to a different sub channel. Each parallel symbol stream is multiplied by a corresponding gain factor in a plurality of gain factors 150. The gain factors 150 are supplied to the transmitter 20 by the receiver 40. The multiplications are performed by the multiplication stage 120 to produce parallel output symbol streams 160. Each of the output symbol streams 160 is modulated onto a corresponding subchannel carrier signal by the multicarrier modulator 130. The modulated carrier signals are then placed on the communication channel 30 as a multicarrier signal. In particularly preferred embodiments of the present invention, the transmitter 20 is located is user communications equipment for connecting a user device such as a personal computer system to other user devices via a data communications network.

Figure 3:
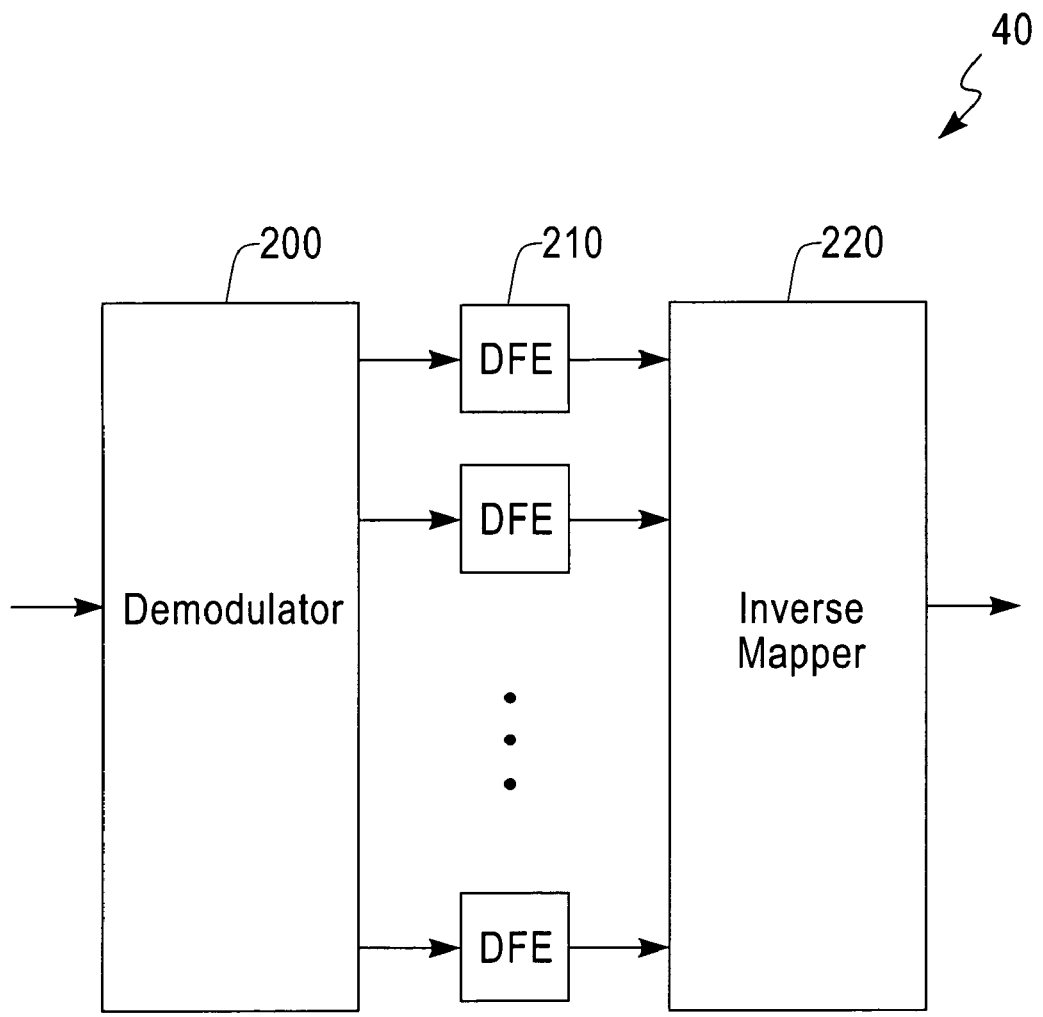
FIG. 3 is a block diagram of a receiver of the communications system.

Referring now to FIG. 3, the receiver 40 comprises a multicarrier demodulator 200 connected to a inverse mapper 220 via a plurality of DFE stages 210. In operation, the demodulator demodulates the multicarrier signal received from the communications channel 30 to generate a plurality of output sub channel signals. Each output sub channel signal is decoded by a corresponding one of the DFE stages to recover the originating symbol stream. The originating symbol streams are then converted by the demapper into the originating information bit stream.

Figure 4:
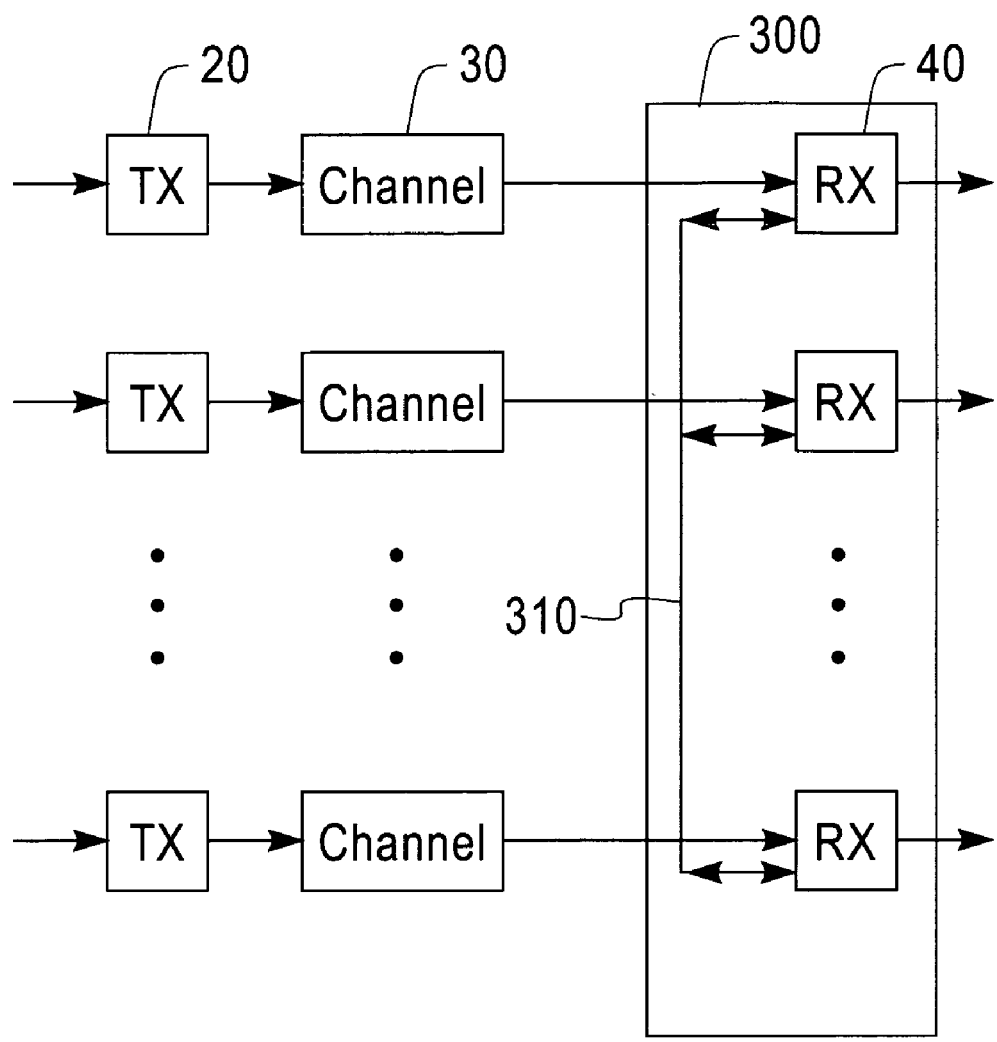
FIG. 4 is a block diagram of communications network apparatus comprising the communications system.

Referring to FIG. 4, a particularly preferred embodiment of the present invention comprises a central communications network node 300 such as a central office switch. The node 300 comprises a plurality of receivers 30 as hereinbefore described with reference to FIG. 3. Each of the receivers 40 is connected to a different communication channel 30. Each of communications channels is connected to a different transmitter 20. The receivers 30 of the node 300 are interconnected via a communications path 310 for selectively passing filter outputs between different receivers 40.

Figure 5:
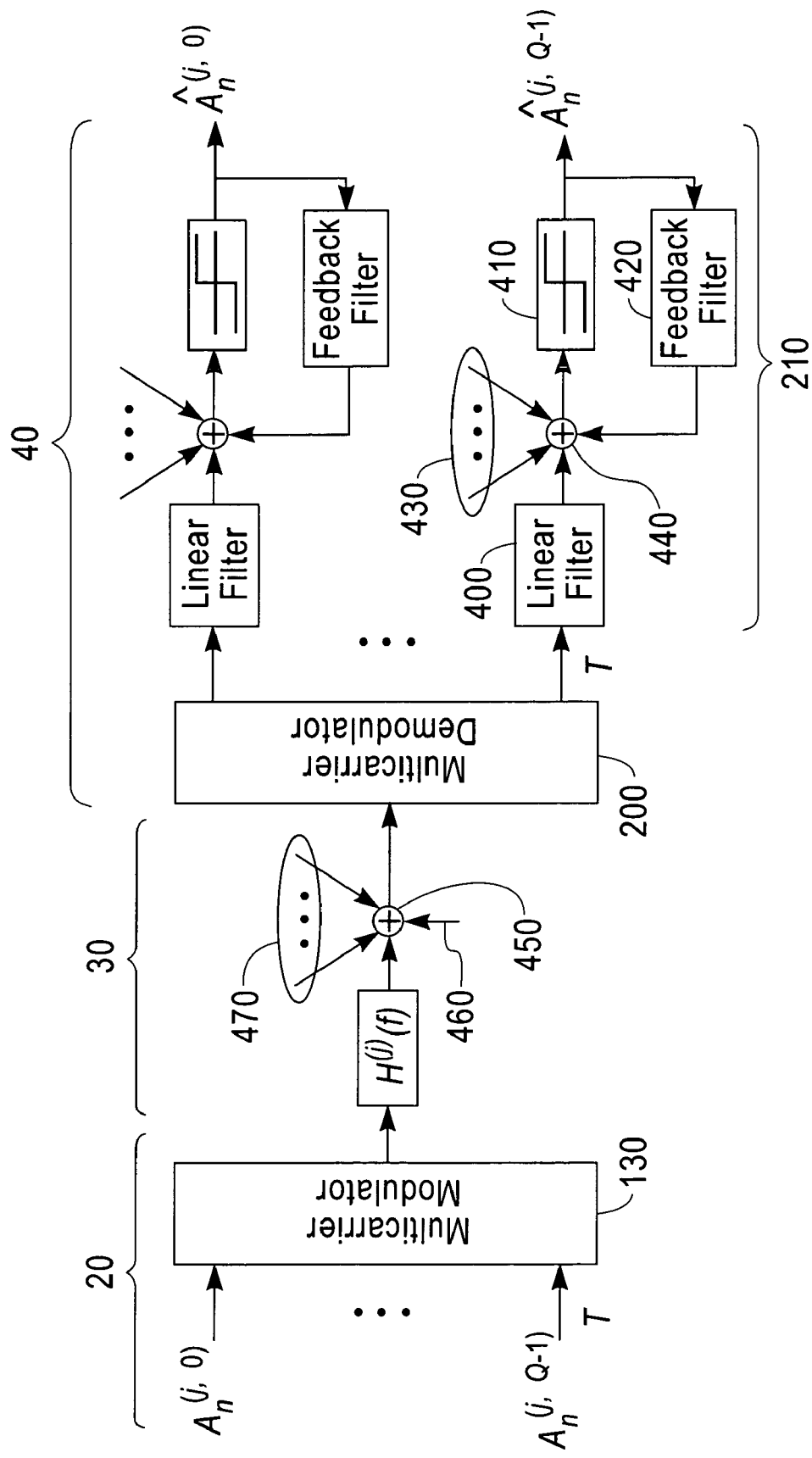
FIG. 5 is a detailed block diagram of the communications system.

With reference to FIG. 5, each user communications channel 30 can be regarded as comprising a summation stage in which far end cross talk 470 from other user channels and additive noise 460 interferes with signals carried on the channel 30. Each DFE stage 210 of each receiver 40 comprises a linear filter 400, a summation stage 440, a decision stage 410, and a feedback filter 420. The linear filter 400 receives a signal from the corresponding sub channel of the demodulator 200. The summation stage 440 receives signals from the outputs of the linear filter 400 and feedback filter 412. The decision stage 410 receives signals from the output of the summation stage 440. The feedback filter 420 receives signals from the output of the decision stage 410.

Figure 6:
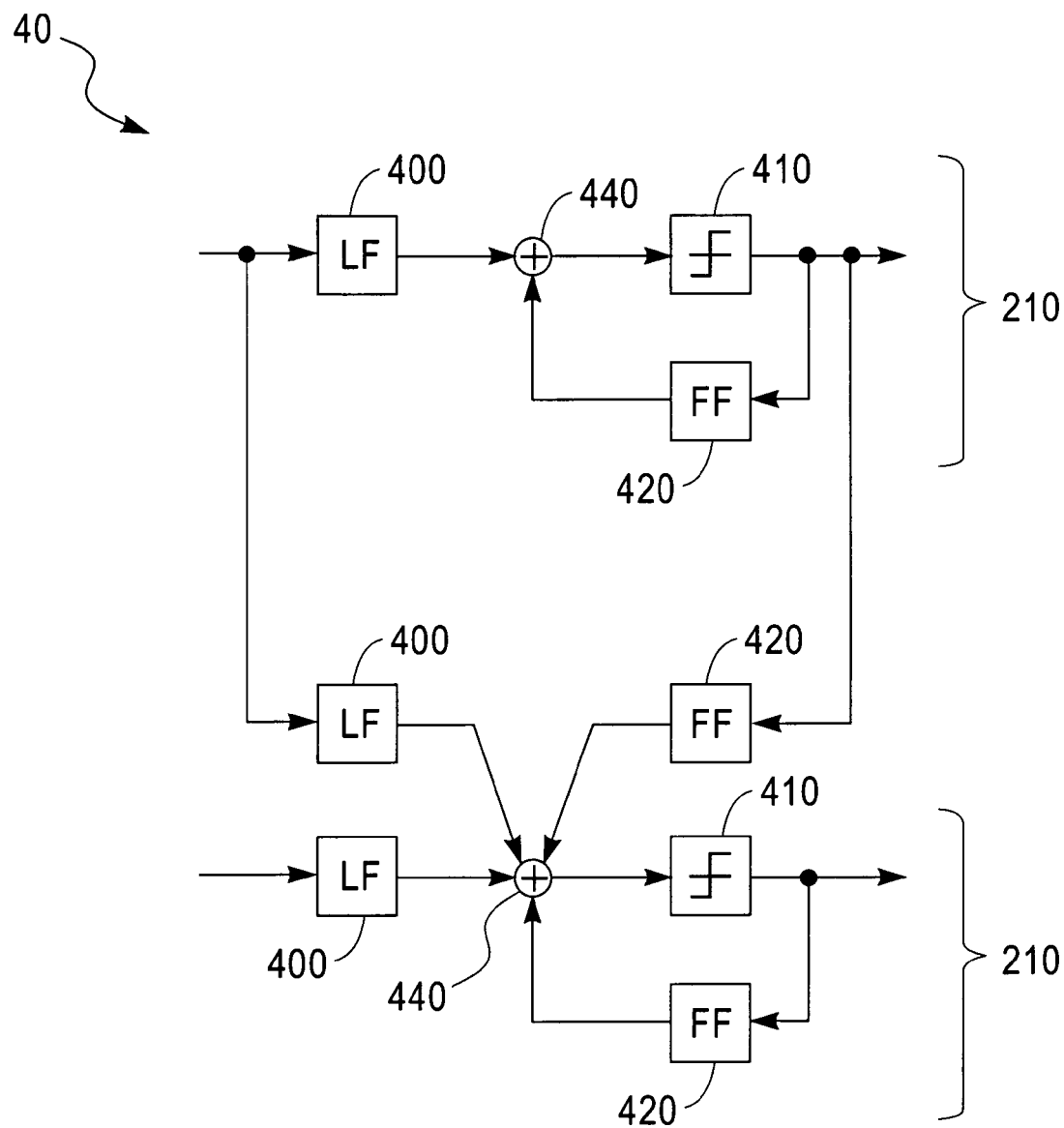
FIG. 6 is a block diagram of part of the communications network apparatus.

The summation stage also receives additional terms 430 from user's sub channel outputs in other receivers 40 of the node 300. These other terms are communicated between the receivers 40 via the communications path 310. With reference to FIG. 6, for example, the additional terms 430 may be tapped from sub channel outputs of demodulators 200 in receivers 40 corresponding to other user's channels and/or from the corresponding output from the DFE stages 210 in those other receivers 40. The tappings from the DFE stages 210 are provided to the summation stage 440 via a feedback filter 420. Similarly, the tappings from the demodulator sub channel outputs are carried to the summation block via a linear filter 400.

Joint Power Back-Off with Multi-user Detection for VDSL

To obtain multi-user detection with moderate receiver complexity, it is assumed that each user adopts multicarrier modulation with Q sub channels for upstream transmission, and that the sub channel signals exhibit non zero excess bandwidth as well as negligible spectral overlap. These signal properties can be efficiently achieved by filtered multitone (FMT) modulation [4],[5]. Returning to FIGS. 4 and 5 in combination, consider a communications network node for receiving upstream transmissions by K users.

In general, sequences of sub channel signal samples at the output of the multicarrier demodulator 200 are obtained at a sampling rate equal to a rational multiple u of the modulation rate. In the interests of simplicity, here an integer u≧2 is assumed. The q-th sub channel complex base band signal at the output of the j-th user demodulator 200 at the instant un+t, t=0, . . . , u−1, is given by $$x_{un+t}^{(j,q)} = \sum_{l=-\infty}^{\infty} a^{(j,q)} h_{ul+t}^{(j,q)} A_{n-l}^{(j,q)} + \sum_{\substack{k=0 \\ k \neq j}}^{K-1} \sum_{l=-\infty}^{\infty} a^{(k,q)} h_{FEXT,un+t}^{(j,k,q)} A_{n-l}^{(k,q)} + w_{un+t}^{(j,q)}, \quad (1)$$

where the sequences of complex-valued symbols $\{A_n^{(k,q)}\}$ transmitted by the K users over the q-th sub channel are chosen from K, in general non identical QAM constellations, $\{h_l^{(k,q)}\}$ denotes the overall q-th sub channel impulse response for the k-th user, $\{h_{FEXT,l}^{(j,k,q)}\}$ denotes the overall q-th sub channel FEXT impulse response from the k-th user to the j-th user, $\alpha^{(k,q)}$ is the q-th sub channel gain for the k-th user, and $\{w_l^{(j,q)}\}$ is a sequence of additive Gaussian noise samples with zero mean and variance $\sigma_{w_{(j,q)}}^2$.

As mentioned earlier with reference to FIG. 2, the sub channel gain, $\alpha^{(k,q)}$, is determined at the receiver 40. Specifically, $\alpha^{(k,q)}$ is determined by execution of an optimum power back-off algorithm to be described shortly For the j-th user, symbol detection at the output of the q-th sub channel is achieved by the DFE stage 210, such that the input to the decision stage 410 is obtained by combining the output signals of K'+1 linear filters 400 and K'+1 feedback filters 420, with K'≦K−1.

Input to the linear filters 400 are the sequences $\{x_l^{(j,q)}\}$ and $\{x_l^{(k_p^{(j)},q)}\}$, p=1, . . . , K', where the elements of the set $\{k_p^{(j)}, p=1, \ldots, K'\}$ denote the indices of the K' FEXT signals that determine the strongest interferers for the j-th user signal at the output of the q-th sub channel.

Input to the feedback filters 420 are the sequences $\{\hat{A}_n^{(j,q)}\}$ and $\{\hat{A}_n^{(k_p^{(j)},q)}\}$, p=1, . . . , K', which denote the symbol decisions at the output of the q-th sub channel for the j-th user and for users with indices $\{k_p^{(j)}, p=1, \ldots, K'\}$.

To determine the MMSE-DFE filter coefficients, it is assumed that N and M coefficients for each linear filter 400 and each feedback filter 420, respectively. Dropping the sub channel index q for ease of notation, and introducing the notation $z^T$, $z^*$, and $Z^H$ to indicate the transpose, complex conjugate, and complex conjugate transpose of a vector z, respectively, the following vectors are defined:

$$h_{um}^{(j)T} = a^{(j)} [h_{um+N-1+\tau^{(j)}}^{(j)}, \ldots, h_{um+\tau^{(j)}}^{(j)}]$$

samples of j-th user impulse response, where $\tau^{(j)}$ is an integer constant delay;

$$h_{FEXT,um}^{(j,i)T} = a^{(i)} [h_{FEXT,um+N-1+\tau^{(i)}}^{(j,i)}, \ldots, h_{FEXT,um+\tau^{(i)}}^{(j,i)}],$$

samples of FEXT impulse response from i-th user to j-th user; the differences between the propagation delays of the i-th user signal and of the crosstalk signals originated by the i-th user are assumed to be negligible;

$$x_{un}^{(j)T} = [x_{un}^{(j)}, \ldots, x_{un-N+1}^{(j)}]$$

signal samples stored at the instant um in the delay lines of the linear filters 400 with input given by the j-th demodulator output;

$$c^{(j,i)T} = [c_0^{(j,i)}, \ldots, c_{N-1}^{(j,i)}]$$

coefficients of the linear filter 400 from i-th demodulator output to j-th decision stage input;

$$d^{(j,i)T} = [d_1^{(j,i)}, \ldots, d_M^{(j,i)}]$$

coefficients of the feedback filter 420 from i-th decision element output to j-th decision stage input;

$$A_n^{(j)T} = [\hat{A}_{n-1-\left\lceil \frac{\tau^{(j)}}{u} \right\rceil}^{(j)}, \ldots, \hat{A}_{n-1-M-\left\lceil \frac{\tau^{(j)}}{u} \right\rceil}^{(j)}]$$

symbol decisions stored at the instant un in delay lines of the feedback filters 420 with input given by the j-th decision stage output, where ⌈z⌉ denotes the smallest integer larger or equal to z; it is assumed that symbol decisions are input to the feedback filters 420 without errors.

The input to the j-th decision stage 100 at the n-th decision instant is then expressed by $$y_n^{(j)} = c^{(j,i)T} x_{un}^{(j)} - d^{(j,i)T} A_n^{(j)} + \sum_{p=1}^{K^i} \left[ c^{(j,k_p^{(j)})T} x_{un}^{(k_p^{(j)})} - d^{(j,k_p^{(j)})T} A_n^{(k_p^{(j)})} \right], \quad (2)$$

and the error at the output of the j-th decision stage 100 at the n-th decision instant is defined as $$e_n^{(j)} = y_n^{(j)} - A_{n-\lceil \tau(j)/u \rceil}^{(j)}. \quad (3)$$

Defining the vectors $c^{(j)\tau} = \{c^{(j,i)\tau}, c^{(j,k^{(i)}(j))\tau}, \ldots, c^{(j,kj)}{}_{l'}^{\tau}\}$ and $d^{(j)\tau} = \{d^{(j,i)\tau}, d^{(i,j)}{}^{96} \ldots d^{(i,j)}{}^{96}\}$, and applying standard coefficient optimization techniques to the DFE stage 210 [6], preferred coefficients of the linear filters 400 and of the feedback filters 420 are given by $$c_{opt}^{(j)} = \Phi^{-1} \left[ h_0^{(j)T}, h_{FEXT,0}^{(k_1^{(j)},j)T}, \ldots, h_{FEXT,0}^{(k_{K'}^{(j)},j)T} \right]^H, \text{ and} \quad (4)$$

$$d_{opt}^{(j)} = \begin{bmatrix} h_u^{(j)T}, h_{FEXT,u}^{(k_1^{(j)},j)T}, \ldots, h_{FEXT,u}^{(k_{K'}^{(j)},j)T} \\ \vdots \\ h_{uM}^{(j)T}, h_{FEXT,uM}^{(k_1^{(j)},j)T}, \ldots, h_{FEXT,uM}^{(k_{K'}^{(j)},j)T} \\ h_{FEXT,u}^{(j,k_1^{(j)})T}, h_u^{(k_1^{(j)})T}, h_{FEXT,u}^{(k_2^{(j)},k_1^{(j)})T}, \ldots, h_{FEXT,u}^{(k_{K'}^{(j)},k_1^{(j)})T} \\ \vdots \\ h_{FEXT,uM}^{(j,k_1^{(j)})T}, h_{uM}^{(k_1^{(j)})T}, h_{FEXT,uM}^{(k_2^{(j)},k_1^{(j)})T}, \ldots, h_{FEXT,uM}^{(k_{K'}^{(j)},k_1^{(j)})T} \\ \vdots \\ h_{FEXT,u}^{(j,k_{K'}^{(j)})T}, h_{FEXT,u}^{(k_1^{(j)},k_{K'}^{(j)})T}, \ldots, h_{FEXT,u}^{(k_{K'-1}^{(j)},k_{K'}^{(j)})T}, h_u^{(k_{K'}^{(j)})T} \\ \vdots \\ h_{FEXT,uM}^{(j,k_{K'}^{(j)})T}, h_{FEXT,uM}^{(k_1^{(j)},k_{K'}^{(j)})T}, \ldots, h_{FEXT,uM}^{(k_{K'-1}^{(j)},k_{K'}^{(j)})T}, h_{uM}^{(k_{K'}^{(j)})T} \end{bmatrix} c_{opt}^{(j)}, \quad (5)$$

respectively. The matrix $\Phi$, for which it is assumed here the inverse exists, has Hermitian symmetry, is in general positive semi definite, and is expressed as $$\Phi = \begin{bmatrix} \Phi^{(0,0)} & \Phi^{(0,1)} & \cdots & \Phi^{(0,K')} \\ \Phi^{(1,0)} & \Phi^{(1,1)} & \cdots & \Phi^{(1,K')} \\ \vdots & \vdots & \ddots & \vdots \\ \Phi^{(K',0)} & \Phi^{(K',1)} & \cdots & \Phi^{(K',K')} \end{bmatrix}, \quad (6)$$

where the N×N square matrices $\Phi^{(i,j)}$ are given by $$\Phi^{(0,0)} = E[x_{un}^{(j)*} x_{un}^{(j)T}] - \sum_{m=1}^{M} \left( \sigma_{A^{(i)}}^2 h_{um}^{(j)*} h_{um}^{(j)T} + \sum_{p=1}^{K'} \sigma_{A(k_p^{(j)})}^2 h_{FEXT,um}^{(j,k_p^{(j)})*} h_{FEXT,um}^{(j,k_p^{(j)})T} \right)$$

-continued $$\Phi^{(l,l)} = E[x_{un}^{(l)*} x_{un}^{(l)T}] - \sum_{m=1}^{M} \left( \sigma_{A(k_l^{(j)})}^2 h_{um}^{(k_l^{(j)})*} h_{um}^{(k_l^{(j)})T} + \sigma_{A(i)}^2 h_{FEXT,um}^{(k_l^{(j)},j)*} h_{FEXT,um}^{(k_l^{(j)},j)T} \right)$$

$$l = 1, \ldots, K'$$

$$\Phi^{(l,0)} = E[x_{un}^{(l)*} x_{un}^{(j)T}] - \sum_{m=1}^{M} \left( \sigma_{A(i)}^2 h_{FEXT,um}^{(k_l^{(j)},j)*} h_{um}^{(j)T} + \sigma_{A(k_l^{(j)})}^2 h_{um}^{(k_l^{(j)})*} h_{FEXT,um}^{(j,k_l^{(j)})T} + \right.$$
$$\left. \sum_{\substack{p=1 \\ p \neq l}}^{K'} \sigma_{A(k_p^{(j)})}^2 h_{FEXT,um}^{(k_l^{(i)},k_p^{(j)})*} h_{FEXT,um}^{(j,k_p^{(j)})T} \right), l = 1, \ldots, K'$$

$$\Phi^{(l,i)} = E[x_{un}^{(l)*} x_{un}^{(i)T}] - \sum_{m=1}^{M} \left( \sigma_{A(j)}^2 h_{FEXT,um}^{(k_l^{(i)},i)*} h_{FEXT,um}^{(k_l^{(i)},i)T} + \sigma_{A(k_l^{(i)})}^2 h_{FEXT,um}^{(k_l^{(i)},k_l^{(i)})*} h_{um}^{(k_l^{(i)})T} \right),$$
$$0 < i < l \leq K'$$

and where E[•] denotes expectation, and $\sigma_{A^{(j)}}^2$ is the variance of the j-th user symbol sequence.

The MMSE value at the decision stage 100 of the j-th user on the q-th sub channel is thus given by $$\sigma_{e^{(j)}}^2 \triangleq E[|e_n^{(j)}|^2]_{min} = \sigma_{A^{(j)}}^2 - v^H \Phi^{-1} v, \quad (7)$$

where $$v = \sigma_{A^{(j)}}^2 \left[ h_0^{(j)T}, h_{FEXT,0}^{(k_1^{(j)},j)T}, \ldots, h_{FEXT,0}^{(k_K^{(j)},j)T} \right]^H.$$

System performance can be measured in terms of achievable bit rate for given channel and crosstalk characteristics. The number of bits per modulation interval that can be loaded on the q-th sub channel is given by [7]

$$b^{(j,q)} = \log_2 \left( 1 + \frac{\sigma_{A^{(j,q)}}^2 / \gamma_{code}}{\sigma_{e^{(j,q)}}^2 \Gamma} \right), \quad (8)$$

where $\gamma_{code}$ is the coding gain assumed to be the same for all users and all sub channels, and $\Gamma$ denotes the "signal-to-noise ratio (SNR) gap" between the minimum SNR required for reliable transmission of I bits per modulation interval and the SNR required by $2^I$-ary QAM modulation to achieve a bit-error probability of $10^{-7}$, I>>1. The achievable bit rate for the j-th user is therefore obtained by summing the values given by equation (8) over the sub channels allocated for upstream transmission and by multiplying the result by the modulation rate 1/T, and is given by $$R^{(j)} = \frac{1}{T} \sum_{q=0}^{Q-1} b^{(j,q)} \quad [bit/s]. \quad (9)$$

Optimum Upstream Power Back-Off

In the previous section, the achievable upstream rate was demonstrated for the j-th user in a VDSL system with K users assuming perfect knowledge of FEXT impulse responses and multi-user detection. As power back-off may be applied by assuming only knowledge of the statistical behavior of FEXT coupling functions, and as it is helpful to compare the performance of the optimum power back-off algorithm with other methods, the problem of finding an optimum power back-off algorithm will be addressed in general without identification of the individual FEXT impulse responses being required. Therefore, in this and the next section an achievable upstream rate of the j-th user given by $$R^{(j)} = \int_B \log_2\left[1 + \frac{S^{(j)}(f)|H^{(j)}(f)|^2}{\left(\sum_{i \neq j} S^{(i)}(f)|H_{FEXT}^{(j,i)}(f)|^2 + \eta(f)\right)\Gamma'}\right] df, \quad (10)$$

$$j = 0, \ldots, K-1,$$

is considered, where B is the total upstream transmission band, $S^{(j)}(f)$ and $H^{(j)}(f)$ are the PSD of the transmitted signal and the channel transfer function for the j-th user, respectively, $\eta(f)$ is the PSD of additive Gaussian noise that is assumed equal for all the users, $\Gamma'$ denotes the SNR gap to capacity, including coding gain and additional margin against other noise sources, and $|H_{FEXT}^{(j,i)}(f)|^2$ is the average FEXT power coupling function from the i-th user to the j-th user. The expression of the average FEXT power coupling function is given by $$|H_{FEXT}^{(j,i)}(f)|^2 = K_{FEXT} f^2 \min(L_i, L_j) |H^{(j)}(f)|^2, \quad (11)$$

where $L_i$ and $L_j$ denote the lengths of the lines for the i-th and j-th users, respectively, and $K_{FEXT}$ is a constant.

For joint application of power back-off and multi-user detection, however, the formulation of the optimum power back-off algorithm does not change, provided the achievable rate of the j-th user given by equation (9) is employed instead of the one given by equation (10).

If the total upstream transmission band is divided into a sufficiently large number Q of sub channels with center frequencies $f_0, \ldots, f_{Q-1}$, and bandwidths $\Delta f_0, \ldots, \Delta f_{Q-1}$, the various functions can be approximated as constant functions within each sub channel. Let $\overline{S}^{(j)}(f)$ denote the PSD for the j-th user without the application of power back-off Then the power back-off problem can be formulated as the problem of finding the minimum of the function $$\sum_{j=0}^{K-1}\sum_{q=0}^{Q-1} E^{(j,q)} \to \min, \quad (12)$$

where $E^{(j,q)} = (a^{(j,q)})^2 \overline{S}^{(j)}(f_q) \Delta f_q$ is the transmit power of the j-th user in the q-th sub channel, subject to the constraints $$0 \leq (a^{(j,q)})^2 \overline{S}^{(j)}(f_q) \leq S_{max}, j=0, \ldots, K-1, q=0, \ldots, Q-1, \quad (13)$$

And $$\sum_{q=0}^{Q-1} \Delta f_q \log_2\left[1 + \frac{(a^{(j,q)})^2 \overline{S}^{(j)}(f_q)|H^{(j)}(f_q)|^2}{\left(\sum_{i \neq j}(a^{(i,q)})^2 \overline{S}^{(i)}(f_q)|H_{FEXT}^{(j,i)}(f_q)|^2 + \eta(f_q)\right)\Gamma'}\right] \geq \tilde{R}^{(j)}, \quad (14)$$

$$j = 0, \ldots, K-1,$$

where $S_{max}$ is a constant maximum PSD value and $\tilde{R}^{(j)}$ the target rate for the j-th user.

Finding the optimum upstream transmit power distribution for each user is therefore equivalent to solving a nonlinear programming problem in the KQ parameters $a^{(j,q)}$, $j=0, \ldots, K-1, q=0, \ldots, Q-1$. The optimum values of these parameters that minimize (12) are found by simulated annealing [8],[9].

Figure 7:
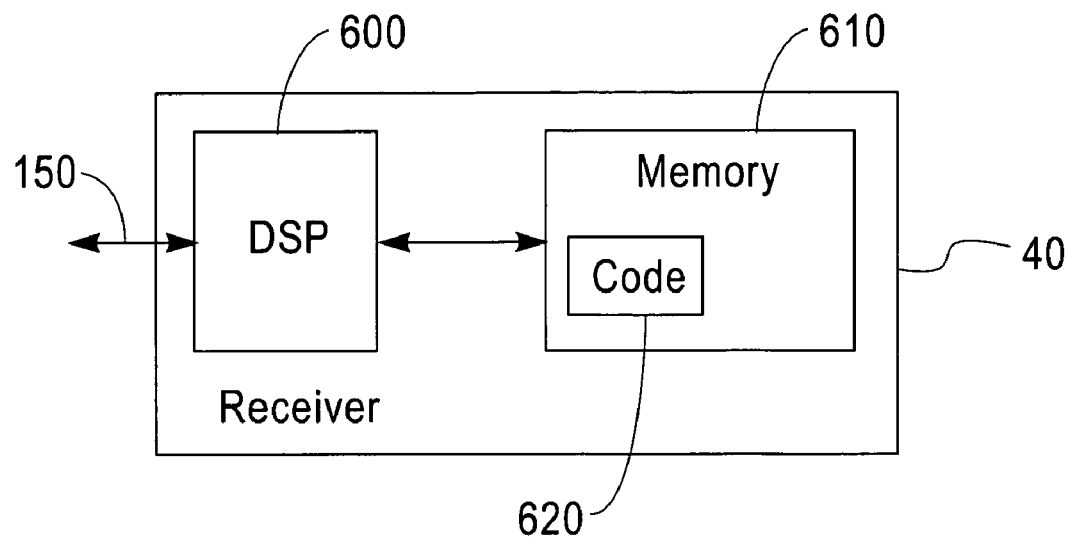
FIG. 7 is another block diagram of the receiver.

Referring to FIG. 7, the receiver 40 comprises a digital signal processor (DSP) 600 connected to a memory 610. Computer program code 620 for calculating the aforementioned KQ parameters $a^{(j,q)}, j=0, \ldots, K-1, q=0, \ldots, Q-1$ in accordance with equations (12) to (14) is stored in the memory 610. In operation, the DSP 600 executes the computer program code 620 to determine these parameters. These parameters are then sent to the corresponding transmitter 20 as hereinbefore described. The SNR gap for the channel 30 may be determined, via the DSP 600, under the control of the program code 620, causing test signals to be generated in the communications channel 30, and specifically in the subchannels thereof, during a training period. Other techniques for determining the SNR gap will be apparent to persons skilled in the art. In particularly preferred embodiments of the present invention, the computer program code 620 is executed periodically by the DSP 600 to periodically reset the parameters. The reset parameters are likewise delivered to the transmitters 20. Referring back to FIG. 4, it will be appreciated that, in other embodiments of the present invention, the DSP 600 may be integrated into the node 300 rather than into a receiver 40 to calculate the parameters corresponding to each channel serviced by the node 300 and to communicate the calculated parameters to the corresponding transmitters 20.

Figure 8:
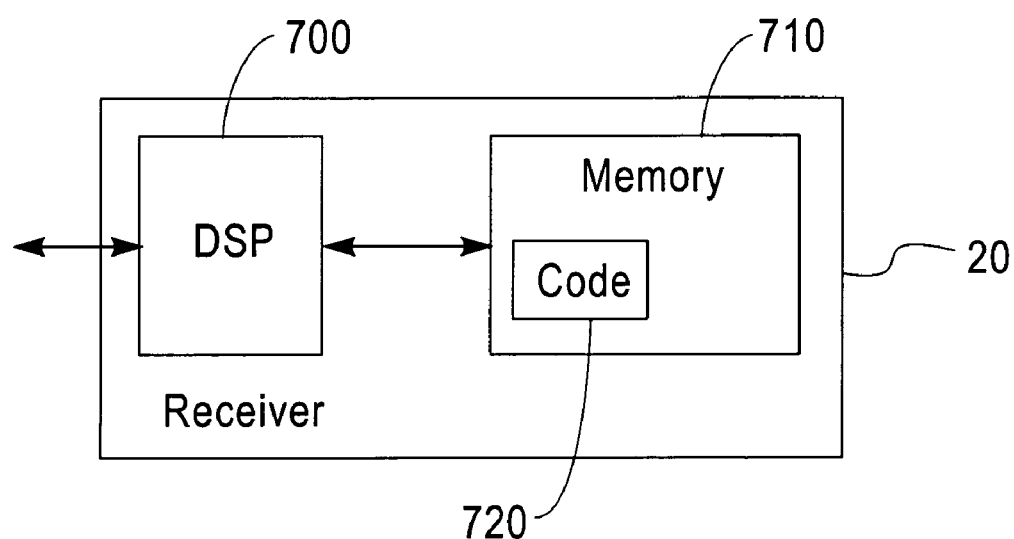
FIG. 8 is another block diagram of the transmitter.

Referring to FIG. 8, the transmitter 20 comprises a DSP 700 connected to a memory 710. Computer program code 710 for performing the function of the multiplication stage 120 is stored in the memory 710. In operation, the DSP 700 executes the computer program code 720 based on the parameters received from the receiver 40 to perform the aforementioned function of the multiplication stage 120. It will be appreciated that, in other embodiments of the present invention, the multiplication stage 120 may be implemented by hardwired circuitry or by a combination of hardwired circuitry and the program code 700 executing on the DSP 710.

Comparison of Three Power Back Off Methods

ETSI [3] has defined two modes of operation, named A and B, for power back-off. For a scenario assuming upstream VDSL transmission over two adjacent lines with unequal lengths, Mode A states that the SNR degradation to either system shall not exceed 3 dB relative to the equal-length FEXT case. Mode B requires that the SNR on the longer line shall not be degraded relative to the equal-length FEXT case; furthermore, degradation to the SNR on the shorter line shall be bounded such that the shorter line can support at least the upstream rate supported on the longer line. Several methods compliant with either Mode A or B have been proposed. Power back-off methods are also classified into methods that allow shaping of the PSD of the transmitted upstream VDSL signal, e.g., the equalized FEXT method, and methods that lead to an essentially flat PSD of the transmitted signal over each individual upstream transmission band, e.g., the average log method. Both the equalized FEXT and the average log methods comply with Mode B. In this section the achievable rates of VDSL upstream transmission using the optimum algorithm, the equalized FEXT method, and the average log method, are compared for various distances and services. The equalized FEXT method requires that the power spectral density of the j-th user be computed as $$S^{(j)}(f) = \min\left[\frac{L_{ref}|H_{ref}(f)|^2}{L_j|H^{(j)}(f)|^2}S_{\max}, S_{\max}\right], \quad (15)$$

where $L_{ref}$ and $H_{ref}(f)$ denote a reference length and a reference transfer function, respectively.

The average log method requires that, for an upstream channel in the frequency band $f_1-f_2$, the j-th user adopts a constant power spectral density given by $$S^{(j)}(f) = P_{f_1-f_2}^{(j)}, f \in (f_1, f_2), \quad (16)$$

where $P_{f_1-f_2}^{(j)}$ is a constant transmit PSD level chosen such that it satisfies the condition $$\int_{f_1}^{f_2} \log_2[P_{f_1-f_2}^{(j)}|H^{(j)}(f)|^2]df = K_{f_1-f_2}, \quad (17)$$

where $K_{f_1-f_2}$ is a constant.

The numerical results presented in this section are derived assuming a 26-AWG telephone twisted-pair cable. The noise models for the alien-cross talk disturbers at the line termination and at the network termination are taken as specified in [10] for the fiber-to-the-exchange case. Additive white Gaussian noise (AWGN) with a power spectral density of −140 dBm/Hz is assumed. Consider upstream VDSL transmission of K=40 users over the frequency bands $B_1$=(2.9 MHz–5.1 MHz) and $B_2$=(7.05 MHz–12.0 MHz), similar to those specified in [3]. The maximum PSD value is $S_{max}$=−60 dBm/Hz.

As discussed earlier, if FEXT power coupling functions are determined according to equation (11), power back-off may be applied without requiring the identification of the individual FEXT impulse responses. The value of the constant in the expression of the FEXT coupling function is $K_{FEXT}$=6.65×10$^{-21}$. Upstream transmission based on multi-carrier modulation with bandwidth of individual sub channels equal to 276 kHz is assumed. For the computation of the achievable rates, an SNR gap to capacity of 10.3 dB, which includes a coding gain of 5.5 dB for an error rate of $10^{-7}$ and a margin against additional noise sources of 6 dB, as well as transmission with an excess bandwidth of 12.5% are assumed.

For each of the methods and for given target rate, consider two scenarios: the users are i) all the same distance from the central office, and ii) uniformly distributed at ten different nodes, having distances $(jL_{max})/10, j=1, \ldots 10$, from the central office. To assess the performance of each method, the maximum line length $L_{max}$ is found, such that all users can reliably achieve a given target rate $\tilde{R}$=13 Mbit/s. The achievable rates are also computed for the case that all users are the same distance from the central office and no power back-off is applied.

Figure 9:
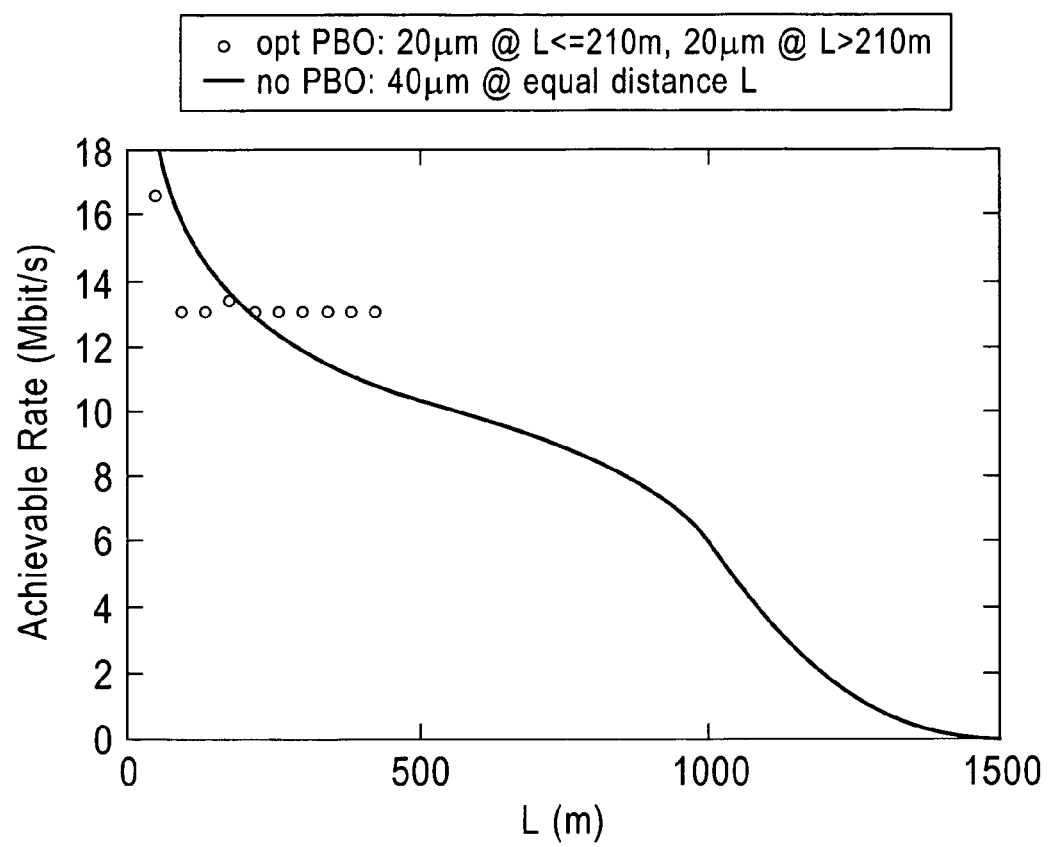
FIG. 9 is a graph of achievable data rate versus cable length using the optimum power back-off algorithm with upstream transmission over $B_1$ for a target rate of 13 Mbit/s.

Initially only upstream transmission over the band $B_1$ is considered. For the optimum algorithm, for each user equal sub channel gains for transmission over $B_1$ are chosen, such that the maximum rate is achieved with minimum transmit power. FIG. 9 shows the achievable rates with the optimum algorithm for the given target rate. Note that in this case $L_{max}$=420 m. Also note that for all users at the same distance from the central office i.e., for scenario i), the optimum algorithm requires the computation of a single parameter. In this case, the achievable rate is equal to the target rate up to a certain characteristic length that corresponds to the length for which the target rate is achieved without applying any power back-off. For lengths larger than the characteristic length, the achievable rate is less than the target rate. For application to scenario ii), the optimum algorithm requires the computation of 10 parameters. Also note that in this case $L_{max}$ may be larger than the characteristic length found for scenario i).

Figure 10:
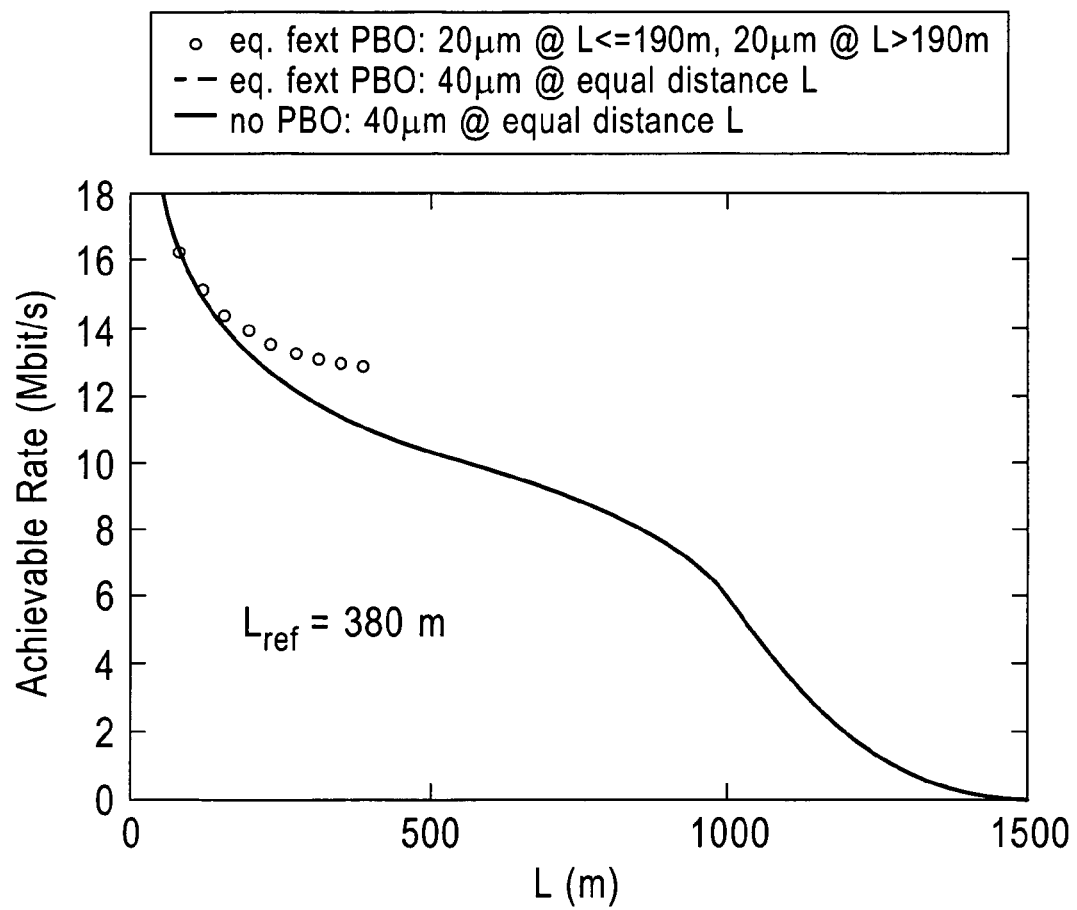
FIG. 10 is a graph of achievable data rate versus cable length using a FEXT method with upstream transmission over $B_1$ for a target rate of 13 Mbit/'s.
Figure 11:
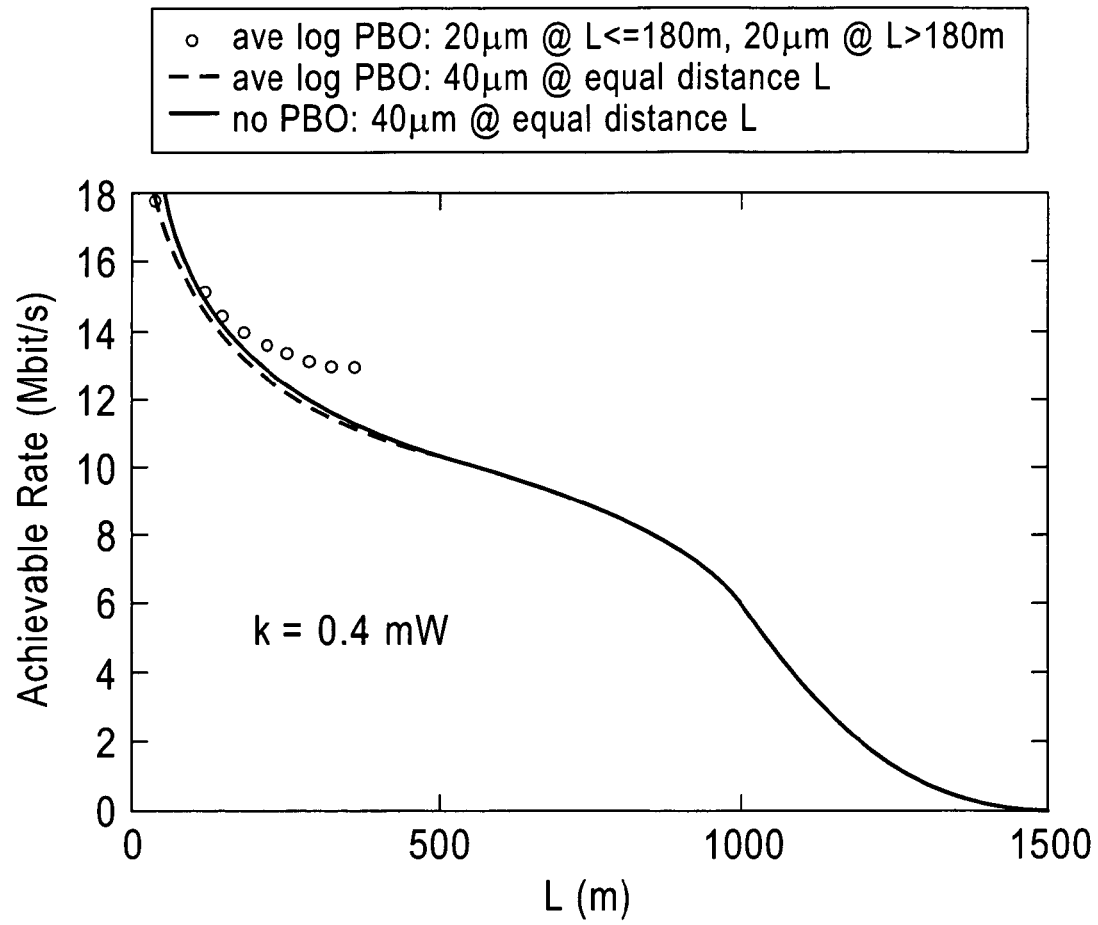
FIG. 11 is a graph of achievable data rate versus cable length using an average log method with upstream transmission over $B_1$ for a target rate of 13 Mbit/s.

FIGS. 10 and 11 show the achievable rates with the equalized FEXT and the average log methods, respectively. For the equalized FEXT method, the reference length is optimized for maximum reach under scenario ii), yielding $L_{max}$=380 m. For the average log method, the parameter $K_{B_1}$ is optimized for maximum reach under scenario ii), yielding $K_{B_1}$=0.4 mW and $L_{max}$=360m.

Figure 12:
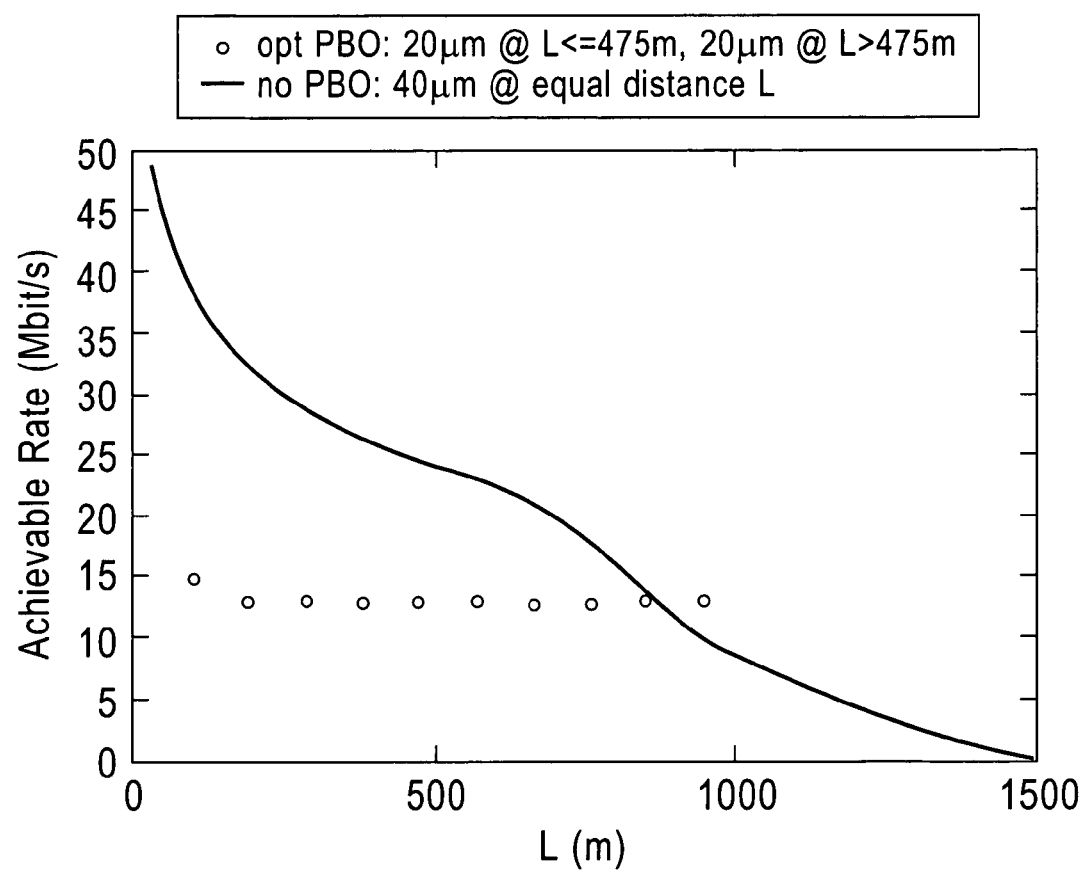
FIG. 12 is a graph of achievable data rate versus cable length using the optimum power back-off algorithm with upstream transmission over $B_1$ and $B_2$ for a target rate of 13 Mbit/s.

Referring now to FIG. 12, consider now upstream transmission over the two bands $B_1$ and $B_2$. For the optimum algorithm different sub channel gains may be chosen for the two bands, but the gains for transmission within each band are equal. FIG. 12 shows the achievable rates with the optimum algorithm. It is found that $L_{max}$=950 m. For application to scenarios i) and ii), the optimum algorithm now requires the computation of 2 and 20 parameters, respectively.

Figure 13:
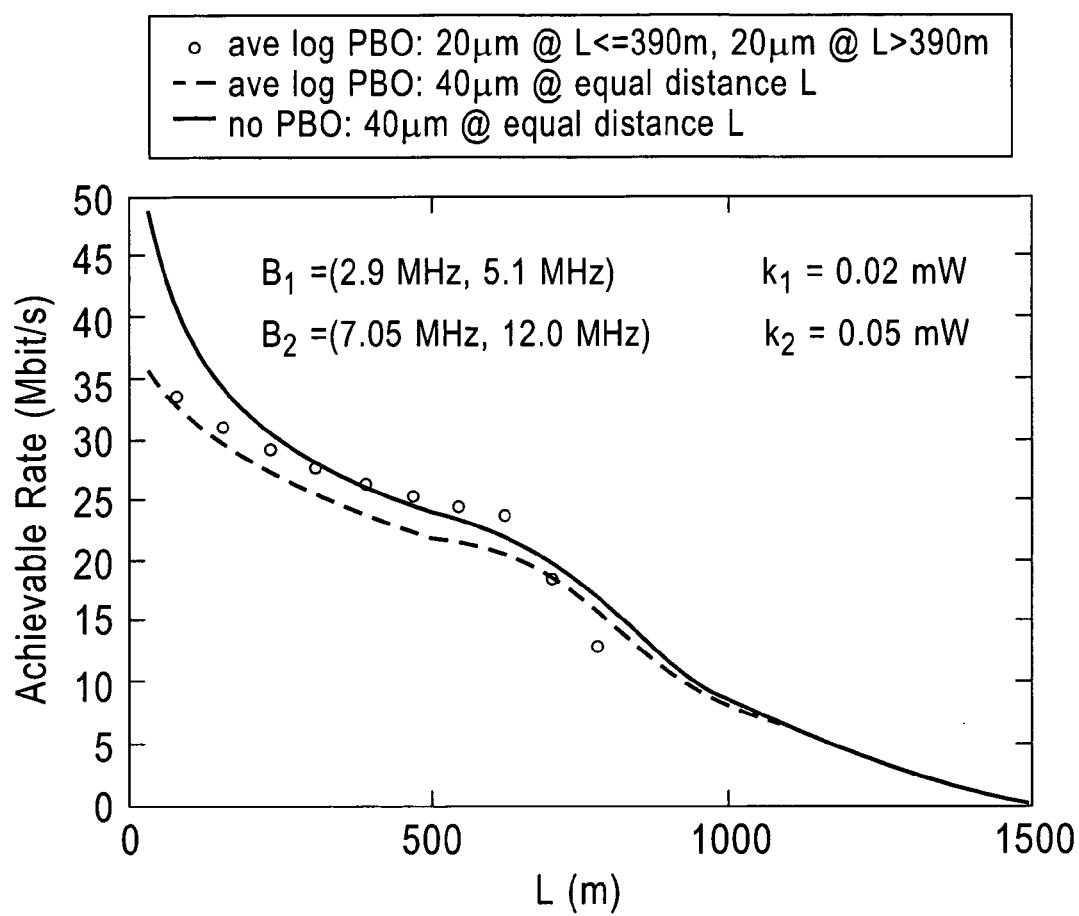
FIG. 13 is a graph of achievable data rate versus cable length using the average log method with upstream transmission over $B_1$ and $B_2$ for a target rate of 13 Mbit/s.

FIG. 13 illustrates the achievable rates with the average log algorithm. Joint optimization of the two parameters $K_{B_1}$ and $K_{B_2}$ for maximum reach under scenario ii) yields $K_{B_1}$=0.02 mW, $K_{B_2}$=0.05 mW, and $L_{max}$=780 m.

At this point, some further observations can be made on the application of power back-off:

Equal upstream services have been assumed for all users. The described optimum algorithm is even better suited for mixed-service scenarios.

The application of optimum power back-off requires the transmit PSDs of the individual user signals to be recomputed at the central office whenever one or more users join the network or drop from the network;

Achieving maximum rate with minimum power might require that the transmit signal PSD be non zero only over disjoint subsets of the band defined for upstream transmission.

Rates Achievable by Joint Power Back-Off and Multi-user Detection

To illustrate system performance achievable with multi-user detection, consider upstream VDSL transmission of K=20 users over the frequency bands $B_1$ and $B_2$, and system parameters as in provided earlier. To obtain numerical results, the users are assumed to be uniformly distributed at ten different nodes having distances $(jL_{max})/10, j=1, \ldots 10$, from the central office, where identification of FEXT impulse responses is performed. The FEXT impulse responses are generated by a statistical model, and the achievable rates of individual users evaluated for $L_{max}$=500 m. Furthermore to assess the relative merits of multi-user detection and coding, the achievable rates for the two cases of uncoded transmission and coded transmission assuming a powerful coding technique yielding 8.5 dB coding gain for an error rate of $10^7$ are computed.

Figure 14:
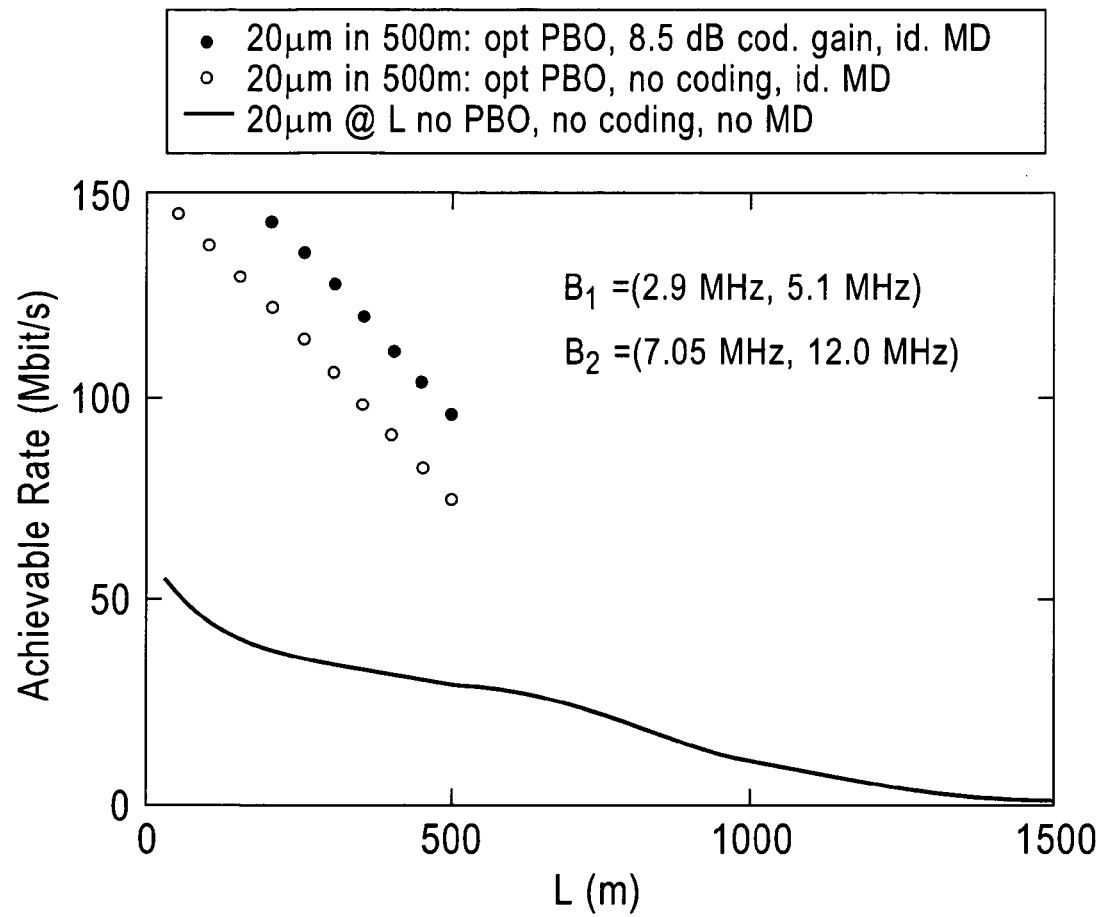
FIG. 14 is a graph of achievable data rate versus cable length with all interferers suppressed.

FIG. 14 shows the achievable rates for perfect suppression of all interferers, which corresponds to the single user bound. For comparison, the achievable rates for the case that all users are the same distance from the central office and neither multi-user detection nor coding are applied are also given.

Figure 15:
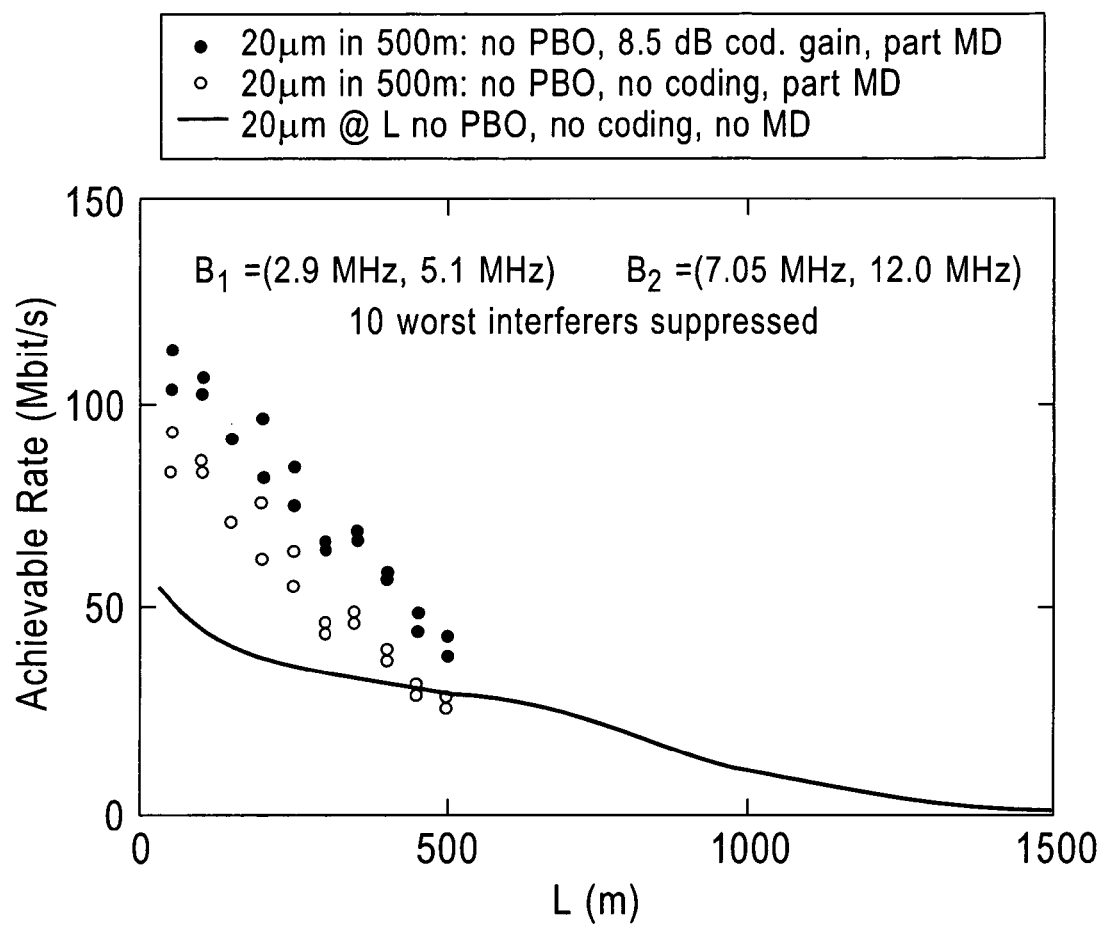
FIG. 15 is a graph of achievable data rate versus cable length with 10 interferers suppressed and no power back-off applied.

FIG. 15 shows the achievable rates for perfect suppression of the ten worst interferers and no application of power back-off. Note that, without power back-off, the partial application of multi-user detection does not lead to a significant increase of achievable rates for all users, even assuming large coding gains.

Figure 16:
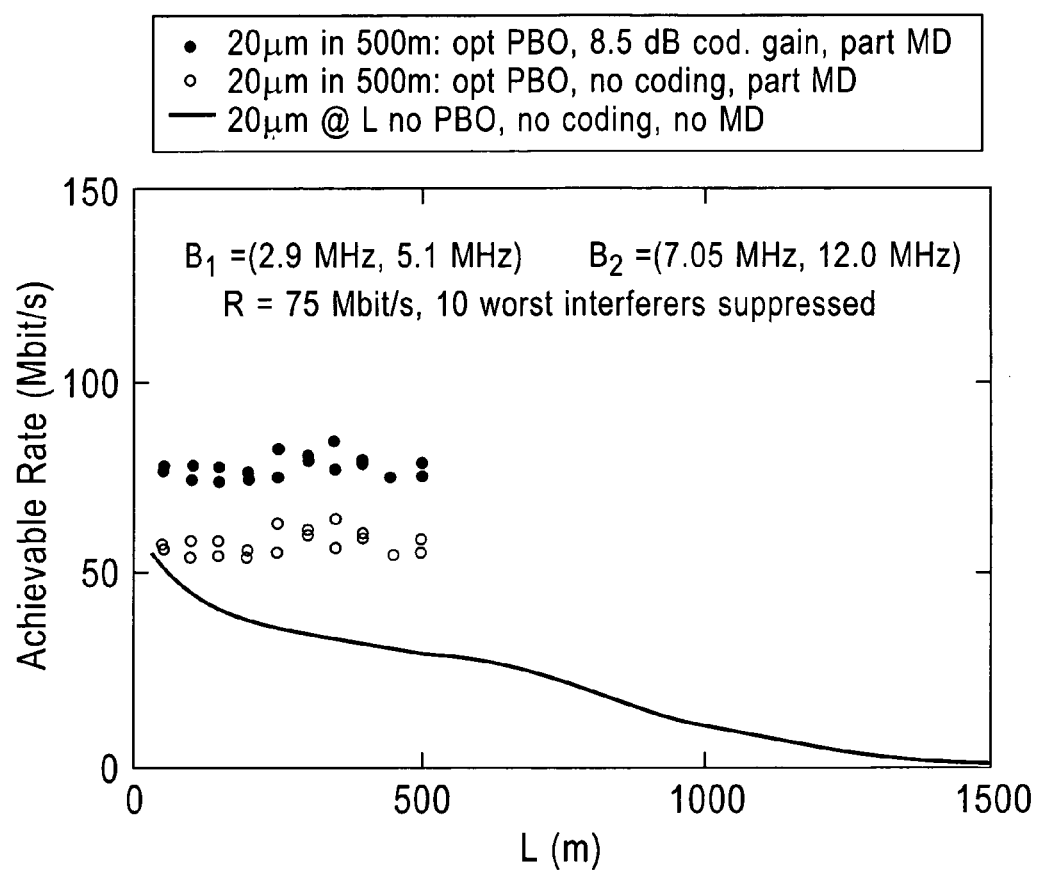
FIG. 16 is a graph of achievable data rate versus cable length with 10 interferers suppressed and power back-off applied for a target rate of 75 Mbit/s.

FIG. 16 depicts the achievable rates obtained for perfect suppression of the 10 worst interferers and application of the optimum power back-off algorithm with target rate of $\tilde{R}$=75 Mbit/s for all users. The target rate is achieved by all users with the joint application of multi-user detection, coding, and power back-off.

FIG. 17 shows a flowchart corresponding to an example of a method for communicating an information signal via one or more subchannels of a communications channel 30 between a transmitting node 20 and a receiving node 40 of a data communications network in accordance with the present invention. The method comprises, at the receiving node 40, in step 800, determining for the or each subchannel, in dependence on the signal to noise ratio of the channel 30 and a target transmission rate for the information signal, a gain factor to be applied to the subchannel signal at the transmitting node to effect transmission of the information signal to the receiving node 40 with minimum transmission power. Details of the determination step 800 have been provided earlier. At step 810, the gain factor for the or each subchannel signal is communicated from the receiving node 40 to the transmitting node 20. At step 820, applying the gain factor to the corresponding subchannel signal at the transmitting node; and, transmitting the information signal to the receiving node.

FIG. 18 shows a flowchart corresponding to an example of a method for optimizing transmission power for communication of an information signal via one or more subchannels of a communications channel 30 between a transmitting node 20 and a receiving node 40 of a data communications network in accordance with the present invention. The method comprises the receiving node, at step 900, determining for the or each subchannel, in dependence on the signal to noise ratio of the channel and a target transmission rate for the information signal, a gain factor to be applied to the subchannel signal at the transmitting node to effect transmission of the information signal to the receiving node with minimum transmission power, and, at step 910, communicating the gain factor for the or each subchannel signal from the receiving node to the transmitting node. Details of the determination step 800 have been provided earlier. It will be appreciated that steps 900 and 910 may be embodied within the receiver 40 or the network node 300 in hardwired circuitry or in the program code 620 for execution by the DSP 600, or by a combination of hardwired circuitry an d the program code 620 for execution by the DSP 600.

FIG. 19 shows a flowchart corresponding to an example of a method embodying the present invention for compensating for cross talk in a multichannel communications link comprising a plurality of channels each having at least one sub channel, between a transmitting node and a receiving node of a data communications network. The method comprises, in a receiving node, for the or each subchannel of each channel, at step 1000, partitioning the subchannels of the other channels into high crosstalk subchannels and low crosstalk subchannels, and, at step 1010 decoding the subchannel signal in dependence on the or each high crosstalk subchannel signal. Details of steps 1000 and 1010 have been provided earlier. It will be appreciated that steps 1000 and 1010 may be embodied within the receiver 40 or the network node 300 in hardwired circuitry or in the program code 620 for execution by the DSP 600, or by a combination of hardwired circuitry and the program code 620 for execution by the DSP 600.

As mentioned earlier, in particularly preferred embodiments of the present invention, the techniques hereinbefore described with reference to FIGS. 17, 18, and 19 are combined. In summary, given the spectrum plans adopted for VDSL transmission, optimum upstream power back-off as hereinbefore described leads to an increase in maximum reach of up to 20% with respect to conventional methods. The increase in maximum reach depends on the distribution of target rates and line lengths of the users in the network. A substantial increase in performance may be achieved by resorting to multi-user detection. For VDSL systems with a large number of users, reduced-complexity multi-user detection where only the most significant interferers are suppressed can also be effective, particularly if it is applied in conjunction with power back-off. The joint application of power back-off and multi-user detection, together with the increased robustness against noise provided by powerful coding techniques, are desirable to achieve extremely high performance with moderate complexity for next-generation DSL systems.

While the invention has been described herein with reference to preferred embodiments, it will be appreciated by those skilled in the art that various changes in form and detail may be made therein without departing from the scope of the invention.

REFERENCES

[1] A. Duel-Hallen, "Decorrelating decision-feedback multi-user detector for synchronous code-division multiple-access channel," *IEEE Trans. Commun.*, vol. 41, pp. 285–290, February 1993.

[2] G. Cherubini, S. Ölcer, G. Ungerboeck J. Creigh, and S. Rao, "100 BASE-T2: A New Standard for 100 Mb/s Ethernet Transmission over Voice-Grade Cables," *IEEE Commun.*, vol. 35, pp. 115–122, November 1997.

[3] "Access transmission systems on metallic access cables; Very high speed Digital Subscriber Line (VDSL); Part 2: Transceiver specification," ETSI Technical Specification 101 270–2 V1.1.1, May 2000.

[4] G. Cherubini, E. Eleftheriou, and S. Ölcer, "Filtered Multitone Modulation for VDSL," Proc. IEEE GLOBECOM'99, Rio de Janeiro, Brazil, pp. 1139–1144, December 1999.

[5] Cherubini, E. Eleftheriou, S. Ölcer, and J. M. Cioffi, "Filter Bank Modulation Techniques for Very High-Speed Digital Subscriber Lines," *IEEE Commun.*, vol. 38, pp. 98–104, May 2000.

[6] J. G. Proakis, *Digital Communications*, $3^{rd}$ Ed., McGraw-Hill, Boston, Mass., 1995.

[7] J. M. Cioffi, "Asymmetrical Digital Subscriber Lines" in *The Communications Handbook*, J. D. Gibson, Ed., CRC Press Inc., pp. 450–479, 1997.

[8] S. Kirkpatrik, C. D. Gelatt Jr., and M. P. Vecchi, "Optimization by simulated annealing approach," *Science*, vol. 220, No. 4598, pp. 671–680, May 1983.

[9] D. Vanderbilt and S. G. Louie, "A Monte Carlo simulated annealing approach to optimization over continuous variables," *J. Comp. Phys.*, vol. 56, pp. 259–271, 1984.

[10] "ETSI VDSL specifications (Part 1) functional requirements," Contribution D.535 (WP1/15), ITU-T SG 15, Question 4/15, Geneva, Switzerland, 21 Jun.–2 Jul., 1999.

The invention claimed is:

1. A data communications network comprising:
a transmitting node;
a receiving node;
a communication channel for communicating an information signal between the transmitting node and the receiving node, the communication channel having one or more subchannels;
the receiving node having a receive signal processor for determining for the or each subchannel, in dependence on the signal to noise ratio of the channel and a target transmission rate for the information signal at the transmitting node to effect transmission of the information signal to the receiving node with minimum transmission power and for communicating the gain factors for the or each subchannel signal from the receiving node to the transmitting node;
the transmitting node having a transmit signal processor for applying the gain factors to the corresponding subchannel signal at the transmitting node, and transmitting the information signal to the receiving node; and,
the receiving node, for each subchannel of each channel, partitioning the subchannels of the other channels based on subchannel characteristics into at least one high crosstalk subchannel and at least one low crosstalk subchannel, and selectively decoding the subchannel signal based on the subchannel characteristics in dependence on the signal on the at least one high crosstalk subchannel.

2. A network as claimed in claim 1, wherein the receiver signal processor determines the gain by simulated annealing.

3. A network as claimed in claim 1, wherein the transmit signal processor comprises a multiplier for multiplying the or each sub channel signal by the corresponding gain factor.

4. A network as claimed in claim 1, wherein the transmit signal processor comprises a modulator for modulating the or each subchannel signal onto a corresponding carrier signal.

5. A network as claimed in claim 4, wherein the transmit signal processor applies the gain factor to the corresponding sub channel signal upstream of the modulator.

6. A network as claimed in claim 1, wherein the communications channel comprises a plurality of subchannels.

7. A receiving node for a data communications network comprising a communication channel for communicating an information signal between a transmitting node and the receiving node, the communication channel having one or subchannels, the receiving node having a receive signal processor for determining for the or each subchannel, in dependence on the signal to noise ratio of the channel and a target transmission rate for the information signal, a gain factor to be applied to the subchannel signal at the transmitting node to effect transmission of the information signal to the receiving node with minimum transmission power, and for communicating the gain factor for the or each sub channel signal to the transmitting node and, for each subchannel of each channel, partitioning the subchannels of the other channels based on subchannel characteristics into at least one high crosstalk subchannel and at least one low crosstalk subchannel, and selectively processing decoding the subchannel signal based on the subchannel characteristics on the at least one high crosstalk subchannel.

8. A method for communicating information signals via respective channels, each having at least one subchannel, of a multichannel communications link between a transmitting node and a receiving node of a data communications network, the method comprising the steps of:
at the receiving node, determining for each sub channel of each channel, in dependence on the signal to noise ratio of the channel and a target transmission rate for the information signal over that channel, a gain factor to be applied at the subchannel signal at the transmitting node to effect transmission of the information signal to the receiving node with minimum transmission power;
communicating the gain factors for each subchannel signal from the receiving node to the transmitting node;
applying the gain factors to the corresponding subchannel signals at the transmitting node; and,
at the receiving node, for each subchannel, of each channel, partitioning the subchannels of, the other channels into at least one high crosstalk subchannel and at least one low crosstalk subchannel, and decoding the subchannel signal in dependence on the signal on the at least one high crosstalk subchannel.

9. A method as claimed in claim 8, wherein the determining step comprises the step of simulated annealing.

10. A method as claimed in claim 8, wherein the applying step comprises the step of multiplying the or more subchannel signal by the corresponding gain factor.

11. A method as claimed in claim 8, and further comprising the step of modulating the of each subchannel signal onto a corresponding carrier signal.

12. A method as claimed in claim 11, and wherein the applying step is performed prior to the modulating step.

13. A computer program product for optimizing transmission power for communication of an information signal via one or more subchannels of a communications channel between a transmitting node and a receiving node of a data communications network, the computer program product comprising a machine readable storage medium storing computer program code which, when loaded in a programmable signal processor in the receiving node, configures the processor to perform the steps of:
determining for the or each subchannel, in dependence on the signal to noise ratio of the channel and a target transmission rate for the information signal, a gain factor to be applied to the sub channel signal at the transmitting node to effect transmission of the information signal to the receiving node with minimum transmission power;
communicating the gain factor for the or each subchannel signal from the receiving node to the transmitting node; and
partitioning the subchannels of the other channels based on subchannel characteristics into at least one high crosstalk subchannel and at least one low crosstalk subchannel, and selectively decoding the subchannel signal based on the subchannel characteristics in dependence on the signal on the at least one high crosstalk subchannel.

* * * * *